United States Patent
Linden et al.

[11] Patent Number: 5,869,836
[45] Date of Patent: Feb. 9, 1999

[54] SCINTILLATION DETECTOR WITH SLEEVED CRYSTAL BOOT

[75] Inventors: Chris W. Linden, North Ridgeville; Jeffrey R. Lutz, Brunswick; William D. Sekela, Aurora, all of Ohio

[73] Assignee: Saint-Gobain Industrial Ceramics, Inc., Worcester, Mass.

[21] Appl. No.: 897,173

[22] Filed: Jul. 18, 1997

Related U.S. Application Data

[60] Provisional application No. 60/026,377 Sep. 20, 1996.
[51] Int. Cl.⁶ .................................................. G01T 1/202
[52] U.S. Cl. ...................................... 250/361 R; 250/256
[58] Field of Search ............................... 250/361 R, 367, 250/483.1, 256

[56] References Cited

U.S. PATENT DOCUMENTS

| | | | |
|---|---|---|---|
| 4,158,773 | 6/1979 | Novack | 250/361 R |
| 4,900,937 | 2/1990 | Dayton et al. | |
| 5,047,635 | 9/1991 | Leaney et al. | 250/361 R |
| 5,070,249 | 12/1991 | White | 250/483.1 |
| 5,744,803 | 4/1998 | Grosinsky et al. | 250/369 |

FOREIGN PATENT DOCUMENTS

| | | |
|---|---|---|
| 0 402 035 A1 | 12/1990 | European Pat. Off. |
| WO 95/23983 | 9/1995 | WIPO. |

*Primary Examiner*—Constantine Hannaher
*Assistant Examiner*—Darren M. Jiron
*Attorney, Agent, or Firm*—Volker R. Ulbrich

[57] ABSTRACT

A scintillation detector (10) includes a scintillation crystal (14) and a shock absorbing member (76) circumscribing the crystal (14). A sleeve (98) circumscribes the shock absorbing member (76) which, in turn, is circumscribed by a housing (12). The sleeve (98) provides for substantial controlled radial loading on the crystal (14). A method of manufacturing the detector (10) includes placing the crystal (14) and shock absorbing member (76) into the sleeve (98), compressing the sleeve 98 and inserting the compressed sleeve (98) into the housing (12) such that the sleeve (98) substantially maintains its compression. The radial stiffness causes vibration induced counts to occur at an excitation frequency which is above the operational bandwidth of the radiation measurements, thereby excluding vibration induced counts for radiation measurements.

13 Claims, 1 Drawing Sheet

SCINTILLATION DETECTOR WITH SLEEVED CRYSTAL BOOT

This application claims the benefit of U.S. Provisional Application No. 60/026,377 filed Sep. 20, 1996.

FIELD OF THE INVENTION

The invention herein described relates generally to a scintillation detector and method for performing radiation-based measurements, and to a method of manufacturing a scintillation detector. The scintillation detector and method are particularly useful for borehole logging applications, but may, however, have use in other applications, particularly those plagued by vibration induced counts intermixed with radiation induced counts.

BACKGROUND OF THE INVENTION

Scintillation detectors have been employed in the oil and gas industry for well logging. These detectors have used thallium activated sodium iodide crystals that are effective in detecting gamma rays. The crystals are enclosed in tubes or casings to form a crystal package. The crystal package has an optical window at one end of the casing which permits radiation induced scintillation light to pass out of the crystal package for measurement by a light sensing device such as a photomultiplier tube coupled to the crystal package. The photomultiplier tube converts the light photons emitted from the crystal into electrical pulses that are shaped and digitized by associated electronics. Pulses that exceed a threshold level are registered as counts that may be transmitted "uphole" to analyzing equipment or stored locally.

The ability to detect gamma rays makes it possible to analyze rock strata surrounding the bore holes, as by measuring the gamma rays coming from naturally occurring radioisotopes in down-hole shales which bound hydrocarbon reservoirs. Today, a common practice is to make measurements while drilling (MWD). For MWD applications, the detector must be capable of withstanding high temperatures and also must have high shock resistance. At the same time, there is a need to maintain performance specifications.

A problem associated with MWD applications is that the detector will report a higher than an actual count rate if the scintillation crystal package produces vibration induced light pulses. The harsh shock and vibration conditions the detectors encounter during drilling can cause a crystal package to emit spurious light pulses in addition to gamma ray induced light pulses. That is, the detector output will be composed of radiation induced counts and vibration induced counts. Heretofore, the detector electronics could not distinguish the vibration induced counts from the genuine gamma counts, whereby the detector reports a higher than actual count rate. The problem is more severe when detecting low level radiation events while the detector is being subjected to a very severe dynamic operational environment.

Some prior art electronic solutions have attempted to filter out vibration induced counts by discriminating on the basis of the pulse shape and/or the signal decay time. These techniques, however, have proven unreliable.

SUMMARY OF THE INVENTION

The present invention provides a "hardware" solution to the aforesaid problem. According to one primary aspect of the invention, components of a radiation detector assembly are rigidified or stiffened to move the resonant frequencies of vibration induced counts from the detector assembly above a threshold frequency (i.e., the upper limit of the operational dynamic disturbance bandwidth). This is accomplished by loading the scintillation crystal both axially and radially such that the several different scintillator rigid body resonant frequencies are above the threshold frequency. Thus, the crystal is loaded within a housing to provide sufficient stiffness such that the operational dynamic bandwidth of the detector application falls below the resonant frequency of vibration induced counts. Therefore, within that environment, vibration induced counts will either not occur or will have a magnitude that falls below an amplitude threshold and will therefore be ignored.

According to a preferred embodiment of the invention, axial loading of the scintillation crystal may be effected in a well known or other suitable manner, while radial loading is accomplished through the novel use of a sleeve split along its axial length such that it can be radially expanded and contracted around a resiliently compressible boot or other shock absorbing member circumscribing the scintillation crystal. The split sleeve is assembled around the boot and scintillation crystal to form a subassembly insertable into a housing, such as a tube or casing preferably made of metal. The housing is internally dimensioned such that the boot is maintained in radial compression for application of a radial compression load on the scintillation crystal. As will be appreciated, the wall thickness of the split sleeve may be selected as desired to provide a predetermined amount of radial loading and thus stiffness. The radial stiffness, along with the axial stiffness, may be selected to impart sufficient rigidity to the detector assembly such that the several different resonant frequencies associated with different vibration modes of the detector assembly, which will produce vibration induced counts if excited, will occur above the operational threshold frequency for the given application.

The sleeve preferably is made of metal having a coefficient of friction with the housing that is substantially less than the coefficient of friction between the resiliently compressible boot and a housing for the scintillation crystal and boot, thereby providing for reduced frictional resistance during insertion of the crystal/boot/split sleeve subassembly into the housing which is internally dimensioned less than the unloaded radial dimension of the subassembly. The split sleeve preferably has sufficient stiffness or rigidity to enable compression of the boot over an axial extent thereof extending axially beyond the location at which the sleeve is compressed by a compression ring, clamp or other suitable member used to facilitate insertion of the crystal, boot and sleeve subassembly into the housing. Accordingly, an end of the subassembly may be radially compressed by the compression ring surrounding the split sleeve at a point spaced from such end so as to permit insertion of such end into the housing with less force than would be necessary without the split ring while still providing the desired radial loading.

Thus, the present invention additionally provides an improved method of assembling a detector assembly. The improved method enables the manufacture of a detector assembly with a radial loading of the scintillation crystal substantially greater than that heretofore provided in similar detector assemblies. In addition, the improved method employing a split sleeve can be used to facilitate manufacture of detector assemblies regardless of the extent of radial loading.

Therefore, according to the invention, a scintillation detector comprises a scintillation crystal, a resiliently compressed shock absorbing member circumscribing the crystal, a sleeve circumscribing the shock absorbing member, and a housing having a casing wall circumscribing the sleeve. A reflector may be interposed between the crystal and shock absorbing member to provide optimal collection of radiation induced counts. The sleeve may also have a longitudinally extending gap in the wall thereof to provide for radial compression, thereby providing for substantial, uniform and controlled radial loading on the crystal.

According to another aspect of the invention, a scintillation detector comprises a scintillation detector subassembly including a scintillation crystal, a resiliently compressed protection means around the crystal, and compressing means around the compressed protection means. A housing circumscribes the subassembly such that the subassembly remains in a compressed state, thereby providing uniform, controlled radial loading on the crystal.

According to yet another aspect of the invention, a method of manufacturing a scintillation detector includes placing a scintillation crystal within a resiliently compressible shock absorbing member and placing the shock absorbing member in a sleeve. The sleeve and shock absorbing member are radially compressed and inserted into a housing which substantially maintains the radial compression, thereby achieving an interference fit between the sleeve and the housing and controlled uniform radial loading along the crystal.

According to a further aspect of the invention, a method of measuring radiation includes the steps of using a scintillation detector having a scintillation crystal loaded within a scintillation crystal housing such that the stiffness on the crystal is sufficiently great such that any vibration induced counts of sufficient amplitude to be recorded as an event occur above a threshold frequency, i.e., above the upper limit of the operational dynamic disturbance bandwidth to which the detector is exposed during radiation measurement. That is, the detector is used in an environment that has a dynamic bandwidth below the threshold frequency, thereby substantially eliminating vibration induced counts in radiation based measurements.

According to a still further aspect of the invention, a method for making radiation based measurements in a high vibration environment includes positioning a scintillation detector having a scintillation crystal in a high vibration environment for interaction with incident radiation, wherein the scintillation crystal has sufficient stiffness such that vibration induced and recordable photons are not excited by the crystal's environmental dynamic conditions. A light sensing device receives emitted photons from the scintillation crystal and converts the photons into electrical signals, wherein the electrical signals substantially represent the radiation being measured.

The invention comprises the foregoing and other features hereinafter fully described and particularly pointed out in the claims, the following description and the annexed drawings setting forth in detail a certain illustrative embodiment of the invention, this being indicative, however, of one of the various ways in which the principles of the invention may be employed.

DETAILED DESCRIPTION OF THE INVENTION

Figure 1:
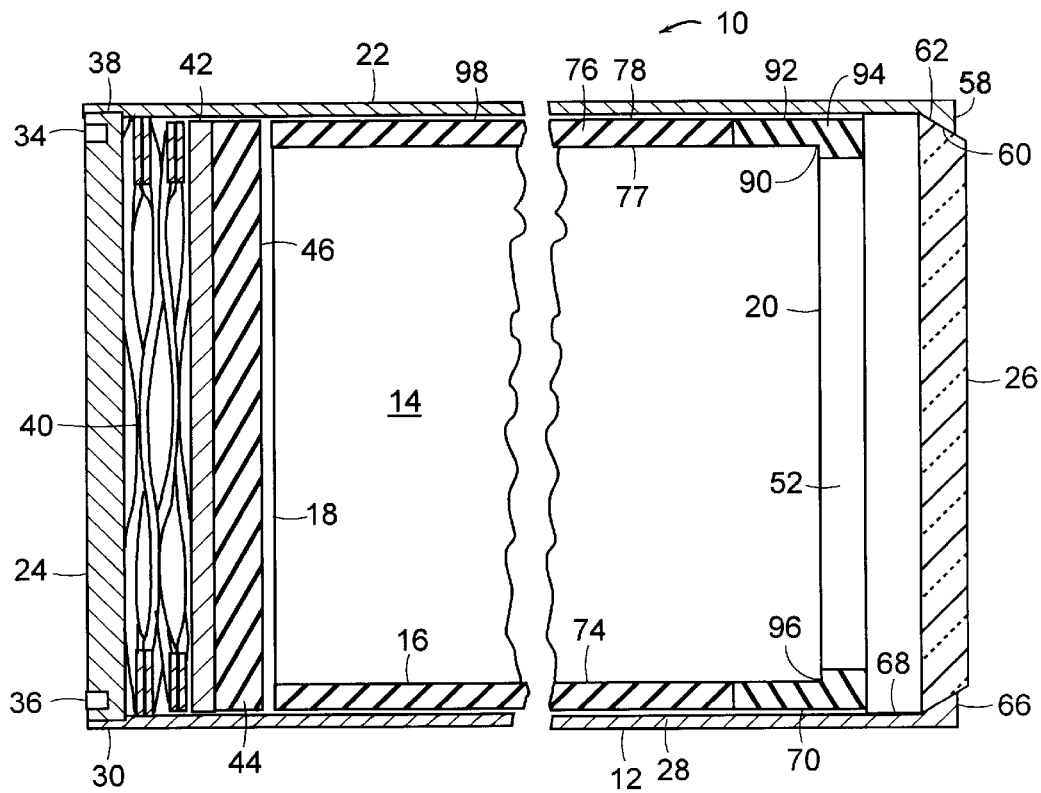
FIG. 1 is a fragmentary longitudinal sectional view of a scintillation detector according to the invention.

The problem of vibration induced counts associated with MWD applications is solved by appreciating that vibration induced counts are a function of the dynamic rigid body vibration modes of the crystal. By increasing the axial and radial stiffness on the crystal within the detector, the frequency of excitation needed to effect recordable vibration induced counts is also increased. In the past, high axial loading could be relatively easily accomplished. However, it was difficult, if not impossible, to attain the necessary radial loading using known assembly techniques. The radial dimension of the uncompressed subassembly needed to attain such high radial loads would be such that attempts to insert the subassembly into the housing would not be possible or would cause damage to the boot. According to the present invention, high radial loading can be accomplished by placing the boot and crystal into a sleeve which is then radially compressed and inserted into the detector housing. The frictional force between the sleeve and housing is substantially less than that between the boot and housing, thereby allowing a greater radial loading to be accomplished during assembly without damage to the boot. The increased radial stiffness causes vibration induced counts to occur at higher excitation frequencies, such as at frequencies above a threshold frequency, i.e., above the operational dynamic bandwidth of the detector. Accordingly, the detector will not be exposed to frequencies high enough to excite the vibratory modes of the detector assembly, whereby the detector will not produce vibration induced counts. Further, to the extent some white noise is present in an MWD application, the magnitude of any vibration induced counts are not sufficiently large to be tallied as a count, i.e, are not of sufficient amplitude to be counted as a recordable event.

The present invention provides an improved scintillation detector assembly having a scintillation crystal circumscribed by a resiliently compressible shock absorbing member. A sleeve circumscribes the shock absorbing member and is compressible or deformable to thereby apply a substantial radial loading on the crystal that is uniform and controllable. The compressed or deformed sleeve is circumscribed by a casing wall of a housing that substantially maintains the radial loading on the crystal. The stiffness imparted to the detector assembly is sufficient to not cause vibration induced photon emissions in the intended operational excitation bandwidth, thereby eliminating vibration induced counts in radiation based measurements.

The sleeve may be composed of a material that has a substantially lower coefficient of friction with the housing than the shock absorbing member, thereby allowing a greater radial loading to be achieved on the crystal due to the reduced frictional forces encountered during insertion of the crystal into a housing. Further, the sleeve may have a longitudinal gap to readily provide for radial compression or may be deformable, crimped or fluted to effectuate substantial radial loading on the crystal.

Referring now in detail to the drawings, FIG. 1 illustrates an exemplary and preferred scintillation detector 10 according to the present invention. The detector 10 comprises a housing 12 encapsulating a scintillation crystal 14. The crystal may be, for example, a thallium-activated sodium iodide crystal as in the illustrated embodiment. The crystal 14 has a cylindrical surface 16 and flat end faces 18 and 20, the surface finish of which may be sanded, polished, ground, etc., as desired.

The housing 12 includes a tubular metal casing 22 which preferably is cylindrical like the crystal 14 as in the present case. The casing 22 is closed at its rear end by a back cap 24 and at its front end by an optical window 26. The optical window 26 should be made of a material transmissive to scintillation light given off by the scintillation crystal 14. In the illustrated embodiment, the optical window 26 is made of crown glass. The casing 22 and back cap 24 preferably are made of stainless steel or aluminum, as is conventional. The back cap 24 is joined to the rear end of the casing 22 by a vacuum type peripheral weld. As seen at the left in FIG. 1, the cylindrical wall 28 of the casing in interiorly recessed to form a welding flange 30 which defines a closed fitting pocket for receipt of the back cap 24. The back cap 24 has, opening to its outer side, an annular groove 34 spaced slightly inwardly from its circumferential edge to form a thin annular welding flange 36 and a reduced narrow thickness connecting web 38. Welding is effected at the outer ends of the juxtaposed thin welding flanges 30 and 36 and the reduced thickness of the connecting web 38 further reduces welding heat conduction away from the welding flanges to permit formation of a desired weld.

The back cap 24 and crystal 14 have sandwiched therebetween, going from left to right in FIG. 1, a spring 40, a backing plate 42, a cushion pad 44 and an end reflector 46. The spring 40, or other suitable resilient biasing means, functions to axially load the crystal and bias it towards the optical window 26, as is conventional. The spring 40 is a stack of wave springs disposed crest-to-crest as shown. Other springs that may be used include coil springs, resilient pads, and the like.

The backing plate 42 functions to spread the spring force across the transverse area of the cushion pad 44 for substantially uniform application of pressure and axial loading to the rear face 18 of the crystal 14. The cushion pad 44 is made of a resilient material and preferably a silicone rubber (elastomer) to which a reflecting material such as aluminum oxide powder may be added. The thickness of the cushion pad may range, for example, from about 0.06 to 0.30 inches for most conventional size crystals ranging in diameter from about 0.25 to 3.0 inches and in length, for example, from about 0.5 to 15 inches.

The cushion pad 44 backs up against the end reflector 46 which is formed by at least one sheet of a white thin porous unscintered PTFE material. Being porous, air or gas can escape from between the reflector film and crystal face to avoid pockets of trapped air or gas. Such pockets are usually undesirable since trapped air or gas could prevent the reflector 46 from being pushed by the cushion pad 44 flat against the rear end face 18 of the crystal 14 and thus have a negative impact on reflectability at the reflector-crystal interface. It also will be appreciated that the resilient pad 44 will conform to the rear end face 18 of the crystal 14 should the rear end face 18 not be perfectly flat. The reflector material may be a 0.010 inch thick, 1.5 gm/cc film which is wrapped at least once around the crystal and possibly two or a few times as desired. The end reflector 46 may alternatively be a tin foil disk which conforms to the surface of the crystal end face 18 and provides suitable reflectance to thereby direct scintillation light toward the optical window 26.

As indicated above, the spring 40 resiliently pushes the crystal 14 towards the optical window 26 to maintain an optical coupling between the front end face 20 of the crystal 14 and the interface of the optical window 26. In the illustrated embodiment, the optical coupling is effectuated by a layer 52 (or interface pad) of suitable optical coupling material and may be a silicone rubber pad sandwiched between the crystal 14 and the optical window 26. The interface pad 52 may be preformed prior to assembly of the detector 10 and is not bonded to the crystal 14 and/or optical window 26 such that the result is a contact only interface between the interface pad 52 and the crystal 14 and/or optical window 26. An exemplary material for the interface pad 52 is a transparent silicone elastomer. The thickness of the interface pad 52 may range from about 0.06 to 0.30 inch for most conventional size crystals ranging in diameter from about 0.25 to 3.0 inches and in length from about 0.5 to 15 inches.

As seen at the right in FIG. 1, the optical window 26 is retained in the casing 22 by an annular lip 58 at the front end of the casing 22. The lip 58 protrudes radially inwardly from the casing wall 28 and defines an opening having a diameter less than the diameter of the window 26. The lip 58 has an axially inner beveled surface 60 and the optical window 26 has a corresponding beveled, axially outer, circumferential edge surface 62 which seats against the beveled surface 60. The mating beveled surfaces are hermetically sealed by a high temperature solder such as 95/5 or 90/10 lead/tin solder. The solder also aids in restraining the window 26 against axial push-out, although its primary function is to effect a high temperature seal. As is apparent from the foregoing, the window 26 is axially trapped between the lip 58 and the crystal 14 and is radially constrained by the casing wall 22. To permit wetting of the glass 26 by the solder, the sealing edge surfaces of the window 26 may have applied thereto a metalized coating such as platinum.

The beveled lip surface 60 may forwardly terminate at a relatively small diameter cylindrical surface 66 and rearwardly at a relatively larger diameter cylindrical surface 68. The cylindrical surface 68 closely surrounds the axially inner portion of the optical window 26 and extends axially inwardly to a slightly larger diameter cylindrical surface 70 which extends axially to the flange 30 at the rear end of the casing 22. The axial interface of the window 26 is aligned with the annular shoulder formed between the cylindrical surfaces 68 and 70.

Between the optical window 26 and the end reflector 46, the crystal 14 is surrounded by a layer 74 of reflecting material which in turn is surrounded by a shock absorbing boot 76. The layer 74 of reflecting material preferably is the above-mentioned white thin porous PTFE material. As noted above, air or gas that might otherwise be trapped between the reflector 46 and the crystal 14 can escape through the porous reflector media 74. The porous PTFE film 74 is tightly wrapped around the crystal 14 and is generally self-adhering to the cylindrical surface 16 of the crystal 14.

The shock absorbing boot 76 closely surrounds and preferably grips the reflector layer 74 to aid in holding the PTFE reflector film 74 tight against the crystal 14. As shown, the boot 76 is preferably cylindrical and concentric with both the crystal 14 and the casing 22. The boot 76 is made of resiliently compressible material and preferably is a silicone rubber, elastomer, or silicone elastomer, the latter being a fast setting silicone elastomer. Preferably, the silicone elastomer does not include any fillers such as $Al_2O_3$ powder that may degrade performance.

Alternatively, the shock absorbing boot 76 may comprise any member that provides a shock absorbing function about the circumference and length of the crystal. The member 76 may have a uniform inner surface 77 and outer surface 78 or may have ribs extending axially or circumferentially on either the inner surface 77 or the outer surface 78. In other alternative embodiments, the shock absorbing member 76 may have dimples or geometrically shaped protrusions on either the inner surface 77, the outer surface 78, or both.

A locating ring 90 extends from the front end of the boot 76 to the optical window 26. The locating ring 90 has an axially inner end portion 92 surrounding the crystal 14 and an axially outer end portion 94 surrounding the interface pad 52. At the intersection of the interior surfaces of the axially inner and outer portions there is a shoulder 96 which functions to locate the locating ring 90 on the crystal 14 during assembly. The locating ring 90 is made of resilient material and preferably a silicone rubber to which $Al_2O_3$ powder may be added for reflection purposes. The locating ring 90 functions to hold and center the circular interface pad 52 during assembly of the detector 10.

Interposed between the casing 22 and the boot 76 is a sleeve 98 which extends longitudinally from the optical window 26 nearly to the back cap 24. The sleeve 98, when circumscribing the boot 76 and crystal 14 in a substantially uncompressed state, has an outside diameter that exceeds the inside diameter of the tubular metal casing 22. Therefore, to insert the sleeve 98 into the casing 22, the sleeve 98 must be compressed, thereby causing the boot 76, made of resilient material, to radially compress against the crystal 14, thereby radially loading the crystal 14. Preferably the sleeve 98 is metal, for example, stainless steel. Alternatively, however, the sleeve 98 according to one broad aspect of the invention may be composed of any material that has a lower coefficient of friction with the casing 22 than does the boot 76 with the casing 22.

Figure 2:
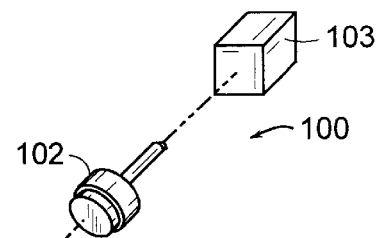
FIG. 2 is an exploded view of components of the scintillation detector according to the invention.

The sleeve 98 must therefore be radially compressible to effectuate substantial radial compression of the boot 76 against the crystal 14. In a preferred embodiment, the sleeve 98 is slotted along its longitudinal length, thereby providing a longitudinally extending gap 99. The longitudinally extending gap 99 may vary between a substantial width, when the boot 76 resides within the sleeve 98 without any externally applied compression, and almost no appreciable width, when the sleeve 98 and boot 76 are under a substantial radial compressive force when inserting the sleeve 98 and boot 76 into the casing 22. Under such compressive forces the longitudinal edges of the slotted sleeve 98 approach and may come into physical contact with one another causing the outside diameter of the sleeve 98 to be reduced. A visual example of the slotted sleeve 98 and the gap 99 is illustrated in FIG. 2 which will be discussed infra.

Alternatively, the sleeve 98 may be compressible in other ways. For example, the sleeve 98 may be a cylinder or substantially cylindrical and formed of a radially flexible material which sufficiently deforms under radial compressive forces to fit within the casing 22 and thereby radially load the crystal 14 within the boot 76. In another alternative, the sleeve 98 may be fluted or crimped to allow for radial compression of the sleeve 98 along its axial length.

The sleeve 98 provides for uniform and controlled radial loading of the crystal 14. The thickness of the sleeve 98 along its axial length may be controlled with tight tolerances, thereby providing for uniform radial loading along the crystal's entire length. To increase or decrease the amount of radial loading, the sleeve 98 thickness may be varied, wherein a thicker sleeve increases the radial loading on the crystal 14 and vice-versa. Since the thickness of the sleeve 98 may be tightly controlled, so too can the radial loading on the crystal 14, and thus the stiffness of the crystal.

The sleeve 98 also facilitates assembly of a crystal-boot subassembly into the casing. During insertion of the crystal-boot subassembly into the casing 22, the sleeve 98 provides a coefficient of friction between the sleeve 98 and the metal casing 22 which is substantially less than the coefficient of friction between the boot 76 and the casing 22. This feature will be further described in conjunction with FIG. 2.

FIG. 2 is an exploded perspective view illustrating a manner in which the detector 10 may be assembled. After appropriately wrapping the crystal 14 with the reflecting layer 74, the crystal 14 is inserted into the boot 76 and the boot 76 in the sleeve 98 to form the a crystal-boot-sleeve subassembly. At this point, the outside diameter of the sleeve 98, with the boot in an uncompressed state, will be greater than the inside diameter of the metal casing 22.

Therefore, to insert the sleeve 98 into the casing 22, a radial compression force is applied to the sleeve 98 at an end first to be inserted into the casing to compress the sleeve 98 sufficiently to enable insertion of the subassembly into the casing 22 preferably with the use of a forcing mechanism 100. The forcing mechanism 100, for example, may consist of a hydraulic ram or push rod 102 coupled to a conventional control apparatus 103 for pushing the crystal-boot-sleeve subassembly into the casing 22. After a first incremental insertion of the subassembly into the casing, the radial compression force is then re-applied to the sleeve 98 at a location spaced a short distance from the sleeve/casing interface to facilitate further insertion of the sleeve 98 into the casing 22. The steps are then repeated until the sleeve 98 entirely resides within the casing 22.

Figure 3:
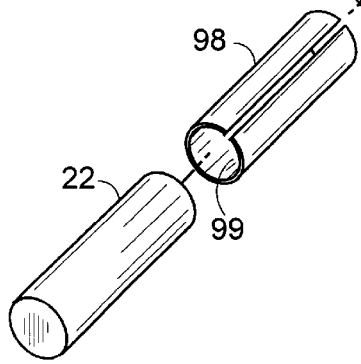
FIG. 3 is a perspective diagram illustrating a scintillation detector subassembly being compressed and inserted into a housing.

The incremental compression preferably is accomplished with a radial clamp 104, for example a compression ring, secured to the sleeve 98 as illustrated in FIG. 3. Each time the radial clamp 104 is secured to the sleeve 98, a length of the sleeve 98 will be sufficiently compressed for insertion into the casing 22. The length of the sleeve 98 available for insertion is a function of the axial rigidity of the sleeve 98. For example, a sleeve 98 having very little axial rigidity would have a small length available for insertion while a sleeve 98 having substantial axial rigidity will have a longer length available for insertion. The axial rigidity of the sleeve 98 will therefore necessarily impact the location at which the radial clamp 104 is applied to the sleeve 98. An axial rigidity is selected such that a length of 0.25 inch may be inserted into the casing 22 at one time. An axial rigidity may be selected to allow, for example, 0.5 inch insertion to be effectuated or alternatively allow 1.0 inch or greater insertion before the need to reposition the radial clamp, or other compressing device. Accordingly, the crystal-boot-sleeve subassembly may be progressively inserted at increments ranging from about 0.25 inch to 1.0 inch, or more.

The insertion process of FIG. 2 benefits from the metal-to-metal interface between the sleeve 98 and casing 22 which substantially reduces the coefficient of friction relative to metal-to-boot interface which would exist without the sleeve 98. The boot 76 typically will have a higher coefficient of friction with the casing 22 than the sleeve 98. Therefore, for a desired radial loading (obtained by compressing the sleeve-boot-sleeve subassembly by a desired percentage of its uncompressed dimension), it will be substantially more difficult to insert the crystal 14 and boot 76 into the metal casing 22 without the sleeve 98. Further, for large radial loadings, such as those necessary to obtain the above described shifting of the resonant frequencies of the detector assembly for MWD applications, it is extremely difficult if not impossible to insert, while maintaining the integrity thereof, a crystal-boot subassembly into the casing 22 without the sleeve 98 due to the substantial coefficient of friction between the boot 76 and casing 22. At such radial loading levels, insertion of a crystal-boot subassembly (sans sleeve) directly into the casing 22 undesirably would cause damage to the boot 76, thereby substantially reducing the boot's functionality as a shock absorber for the high vibration environment experienced by the detector 10. The use of the sleeve 98 enables a substantially higher radial compression force to be achieved while maintaining the integrity of the boot.

Although the invention has been shown and described with respect to certain preferred embodiments, it is evident that equivalent alternation and modifications will occur to others skilled in the art upon the reading and understanding of this specification and the annexed drawings. In particular regard to the various functions performed by the above described elements (components, assemblies, devices, compositions, etc.), the terms, including a reference to a "means" used to describe such elements are intended to correspond, unless otherwise indicated, to any element which performs the specified function of the described element (i.e., that is functionally equivalent), even through not structurally equivalent to the disclosed structure.

What is claimed is:

1. A scintillation detector comprising a scintillation crystal, a resiliently compressed shock absorbing member circumscribing the crystal, a sleeve circumscribing the shock absorbing member, and a housing having a casing wall circumscribing the sleeve and radially constraining the sleeve against radial expansion forces exerted thereon by the resiliently compressed shock absorbing member.

2. A scintillation detector as set forth in claim 1, comprising a reflector interposed between the crystal and the shock absorbing member, wherein the reflector substantially surrounds the crystal.

3. A scintillation detector as set forth in claim 1, wherein the crystal, the shock absorbing member, the sleeve and the casing wall are each cylindrical and concentric.

4. A scintillation detector as set forth in claim 1, wherein the shock absorbing member comprises a material having a surface shape selected from the group consisting of a uniform surface, axially extending ribs, circumferentially extending ribs, outwardly directed protrusions, inwardly directed protrusions, and inwardly and outwardly directed protrusions.

5. A scintillation detector as set forth in claim 1, wherein the shock absorbing member is a cylindrical boot.

6. A scintillation detector as set forth in claim 1, wherein the shock absorbing member is made of an elastomeric material.

7. A scintillation detector as set froth in claim 1, wherein the sleeve is substantially cylindrical and has a longitudinally extending slit which allows the sleeve to radially expand or contract.

8. A scintillation detector comprising:

a scintillation detector subassembly comprising a scintillation crystal, a resiliently compressed shock absorber around the crystal, and a relatively incompressible and relatively rigid sleeve around the compressed shock absorber; and a housing surrounding the subassembly, the subassembly being maintained by the housing in a compressed state and under a radial load by radial expansion forces exerted by the compressed shock absorber.

9. A method of manufacturing a scintillation detector, comprising the steps of placing a scintillation crystal within a resiliently compressible shock absorbing member, placing the shock absorbing member within a sleeve having an outside diameter, radially compressing the sleeve around the shock absorbing member and crystal to a reduced outside diameter whereat the shock absorbing member is resiliently radially compressed, and inserting the compressed sleeve into a housing having an inside diameter that is smaller than the outside diameter of the uncompressed sleeve.

10. A method as set forth in claim 9, wherein the radially compressing step further comprises positioning a radial compressing device on the sleeve at a first location adjacent but spaced apart from an end of the sleeve to be first inserted into the housing for compressing the sleeve in the vicinity thereof to a reduced diameter.

11. A method as set forth in claim 10, wherein said inserting step comprises inserting a portion of the crystal, shock absorbing member and sleeve which is compressed to the reduced outside diameter into the housing by the radial compressing device, repositioning the radial compressing device on the sleeve at a second location adjacent and axially spaced apart from the first location for compressing the sleeve in the vicinity thereof to a reduced diameter, and repeating the insertion and repositioning steps until the sleeve is inserted into the housing.

12. A method of measuring radiation, comprising the steps of using a scintillation detector having a scintillation crystal constrained within a scintillation crystal housing such that the radial stiffness thereof is sufficiently great so as to make vibration induced counts occur above an environmental excitation threshold frequency, and operating the scintillation detector in an operational environment having a dynamic bandwidth below the environmental excitation threshold frequency, thereby substantially eliminating vibration induced counts in radiation based measurements.

13. A method as set forth in claim 12, comprising the step of using a light sensing device to convert photons received from the scintillation detector into electrical signals, wherein the electrical signals substantially represent the radiation being measured.

* * * * *